Figure 1A:
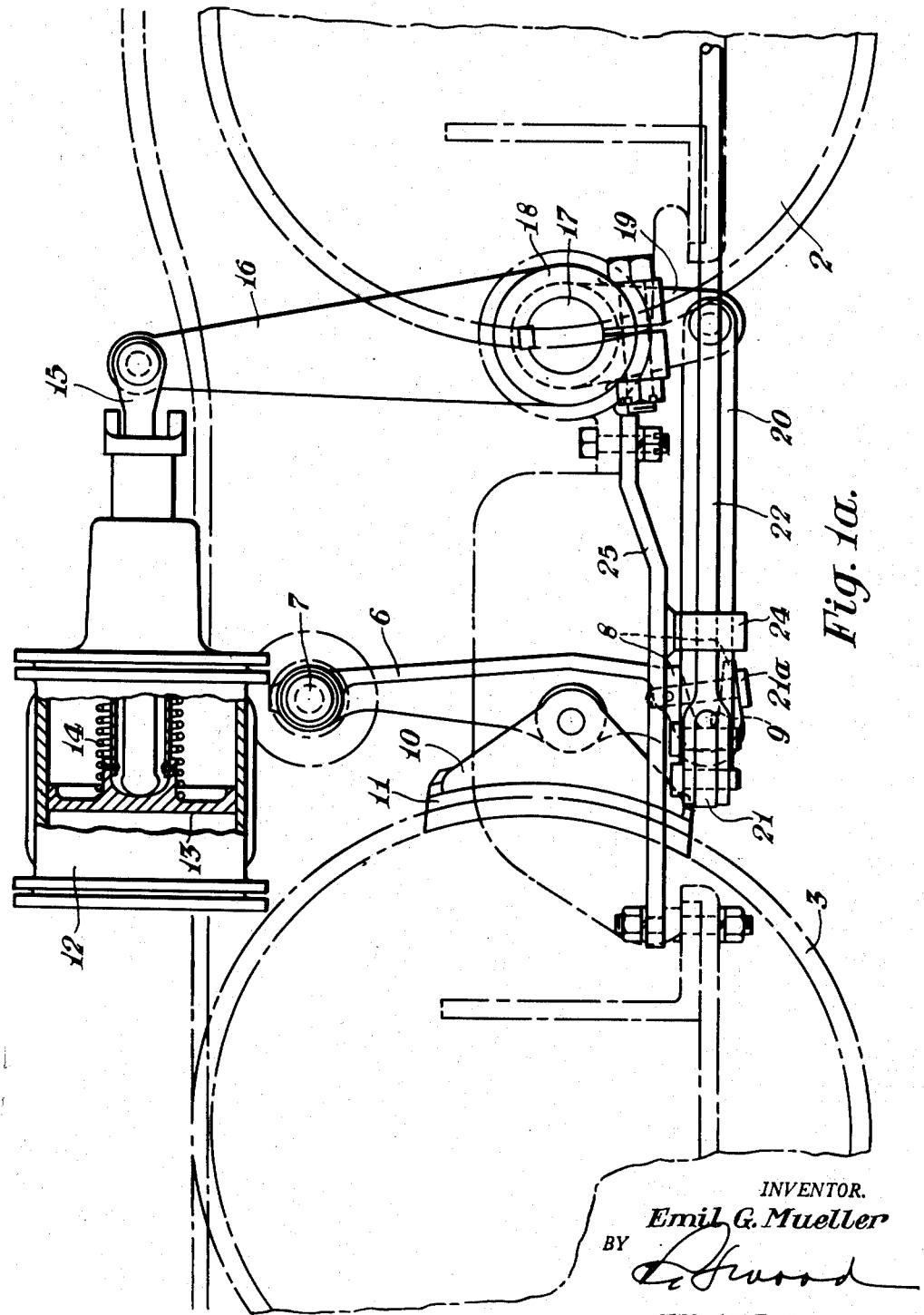

Jan. 12, 1954     E. G. MUELLER     2,665,778
BRAKE MECHANISM
Filed April 21, 1948     4 Sheets-Sheet 1

INVENTOR.
Emil G. Mueller
BY
HIS ATTORNEY

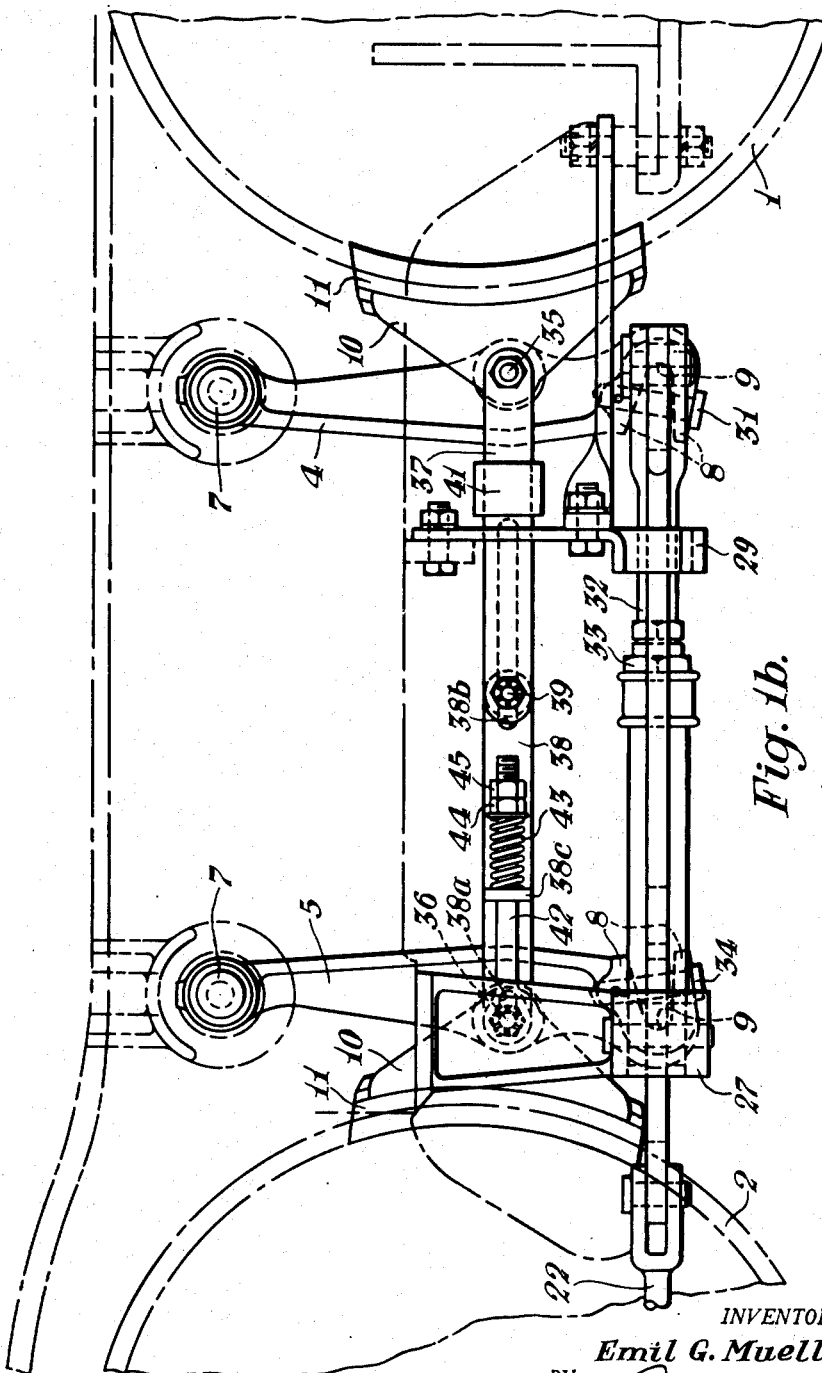

INVENTOR.
Emil G. Mueller
BY
HIS ATTORNEY

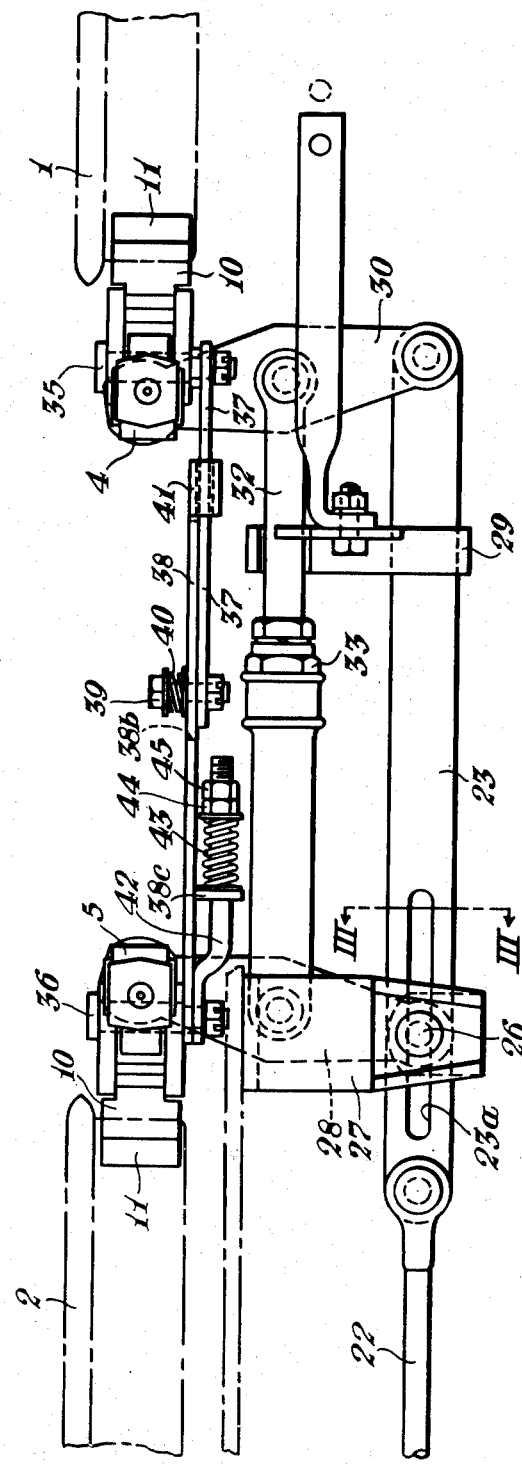
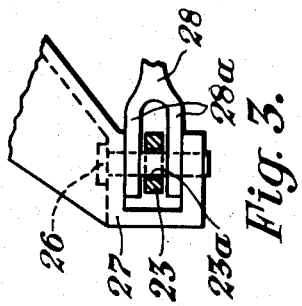

Patented Jan. 12, 1954

2,665,778

UNITED STATES PATENT OFFICE 2,665,778

BRAKE MECHANISM

Emil G. Mueller, Churchill Borough, Pa., assignor to The American Brake Company, Swissvale, Pa., a corporation of Missouri Application April 21, 1948, Serial No. 22,282

2 Claims. (Cl. 188—197)

My invention relates to brake mechanism for railway rolling stock, and particularly to brake mechanism for use on a truck having at least three wheels on each side.

My invention is shown and described herein as applied to a six-wheel motor truck for a diesel electric locomotive. While certain features of my invention are of particular utility in connection with such a truck, other features are of general utility.

In a motor truck of the type described, most of the space between the wheels is taken up by the driving motors and their associated structures. It is therefore necessary to mount the brake rigging outside of the wheels. In order to provide adequate clearance between the brake mechanism and roadside structures, the brake mechanism must be made as small and compact as possible. Since the largest unit in the brake mechanism is the brake operating cylinder, it is desirable to use as few cylinders as possible. If one cylinder is used to operate the brake shoes on several wheels, it must be connected to the brake shoes which are located remote from it by a rather long and complex linkage, requiring a somewhat elaborate guiding and supporting structure. Such guides and supports introduce friction which resists movement of the various parts of the linkage.

Friction in a brake rigging of the type in question presents no substantial problem during application of the brakes, because the power available to apply the brakes is more than ample to overcome any friction which may be encountered. However, friction in the linkage must be taken into account in considering the releasing movement of the brakes. Railway vehicle brakes are commonly arranged so that gravity tends to move them to their released positions. It is also common to provide a spring acting on the piston of the brake operating cylinder in a releasing direction.

In a long and complex linkage such as that described above, gravity and the release spring in the brake cylinder do not always insure equal releasing travel of all the brake shoes. Wherever an equalizer lever is used in the linkage and the friction forces are different between the equalizer and the several shoes, then it is possible for one shoe to be retarded in its releasing travel more than another. The releasing forces due to gravity and the releasing spring in the operating cylinder may then be expended in causing an overtravel of the shoe which is less retarded by friction, while the shoe which is retarded travels less than its designed releasing distance. The frictionally retarded shoe may under such conditions be left in a position wherein it engages the wheel at times, resulting in undesirable wear of both shoe and wheel.

It is therefore an object of my invention to provide an improved brake releasing spring arrangement. A further object is to provide such a brake releasing spring arrangement for use in connection with a brake rigging wherein a single cylinder operates a plurality of brake shoes.

A further object is to provide improved releasing spring means for use in connection with two brake shoes located on adjacent sides of adjacent wheels.

Another object is to provide an improved brake releasing mechanism of the type shown and claimed in the copending application for Letters Patent of the United States, Serial No. 17,421, filed by Thomas R. McGowan on March 27, 1948, for Brake Mechanism, now Patent No. 2,575,825, issued November 20, 1951.

According to my invention, I provide each wheel with a single brake shoe, and I employ a brake cylinder for actuating the shoes associated with three wheels on one side of the truck. The piston rod of each brake cylinder is pivotally connected at one end to the upper end of a brake cylinder lever which is secured at its lower end to a crank pivotally mounted on the truck frame. The crank is connected through a push connector with a first equalizer lever at a point intermediate its ends. This equalizer lever is operatively connected at its inner end with a brake shoe for the rear wheel of the truck. The outer end of the equalizer lever is operatively connected by means of a pull rod with a slidably guided pull link which extends longitudinally of the truck between the first and second wheels. A second equalizer lever has its outer end pivotally connected to the pull link and its inner end operatively connected to a brake shoe associated with the front wheel of the truck. A second push connector connects an intermediate point on the second equalizer lever with an intermediate point on a third lever whose outer end is pivotally attached to the truck frame and whose inner end is operatively connected to the brake shoe on the center wheel of the truck.

Each brake shoe is mounted on a brakehead which is pivoted by means of a brakehead pin on a brake hanger of conventional construction. The brake hanger and shoe for the forward wheel of the six-wheel truck are located at the rear side of that wheel. The brake hanger and shoe for the intermediate wheel of the truck are located on the forward side of that wheel. Therefore, these two brake shoes with their associated brake hangers are located on adjacent sides of adjacent wheels. In order to insure that these two brake shoes move to their released position, I provide a link pivotally attached to one brakehead pin and connected to the other adjacent brakehead pin by means of a slot which provides a lost-motion connection. A spring rod is pivotally attached to the other brakehead pin and carries a coil spring between a retainer on the spring rod and a lug attached to the link which connects the two brakehead pins. This spring acts in a direction to take up the lost motion in the slotted link. When the brakes are applied, the spring is compressed and the brakehead pin moves along the slot. When the brakes are released, the spring moves the brakeheads relative to each other in a direction to take up the lost motion in the slot and thereby release the brake. The link which connects the two brakehead pins is made in two sections connected by a slip friction arrangement so that the length of the link is varied automatically to compensate for wear of brake shoes and wheels. In this way, the amount of releasing travel of the brake shoes provided by the releasing spring is maintained substantially constant regardless of such wear.

This brake releasing spring associated with the two front wheels of the truck produces a definite releasing travel of the pull rod connected to the outer end of the equalizer lever nearest the pressure motor. The releasing spring on the motor provides a definite releasing travel of the intermediate point on that equalizer lever. The two springs therefore cooperate to insure that all parts of the brake rigging are restored to their released positions when the pressure is exhausted from the motor.

Other objects and characteristic features of my invention will become apparent as the description proceeds.

I shall describe one form of brake rigging embodying my invention, and shall then point out the novel features thereof in claims.

Figure 2A:
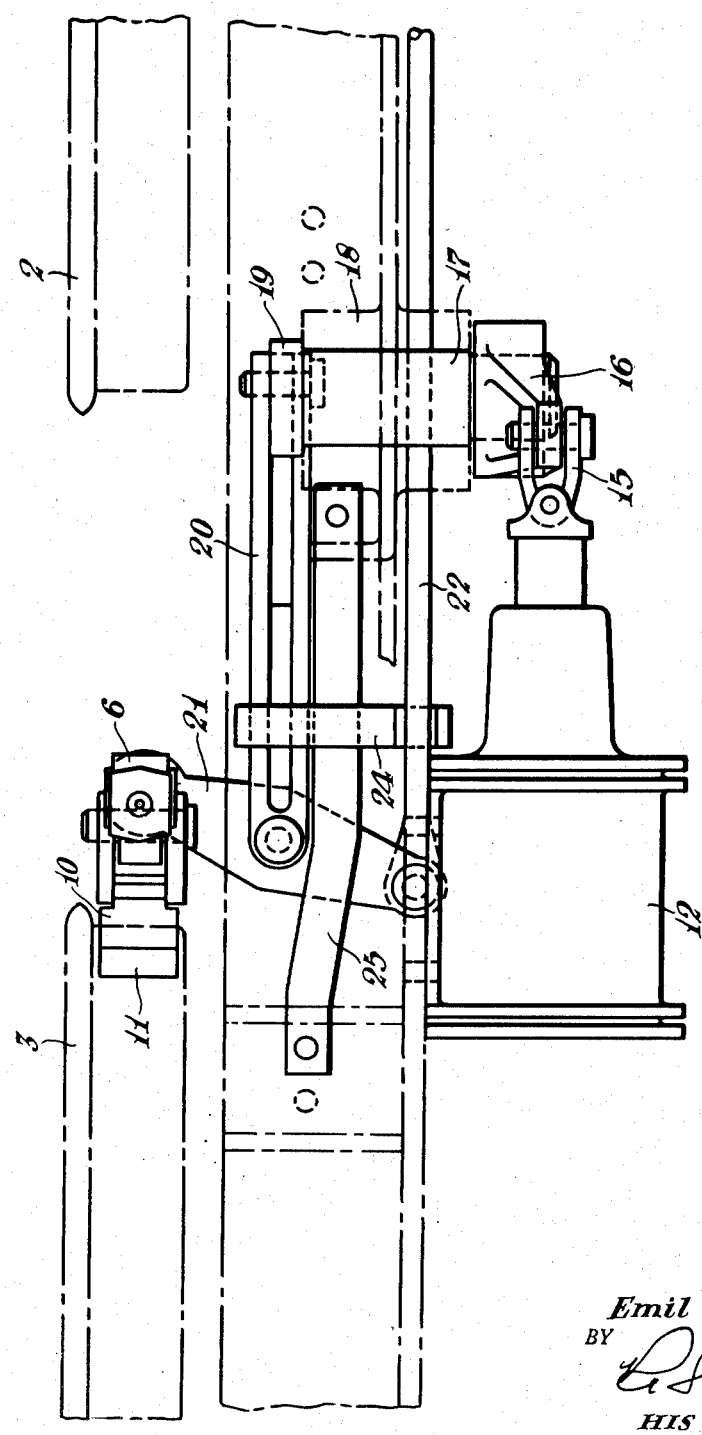

In the accompanying drawings, Figs. 1a and 1b together form a side elevational view of a diesel electric locomotive truck provided with one form of brake mechanism embodying my invention. Figs. 2a and 2b together form a top plan view of the brake rigging of Figs. 1a and 1b, showing that portion which is attached to one side of the truck, it being understood that the rigging on the other side of the truck is identical with that shown. Fig. 3 is a cross sectional view taken on the line III—III of Fig. 2b, looking in the direction of the arrows.

Referring to the drawings, the reference characters 1, 2, and 3 designate respectively the front, middle, and rear wheels at the right-hand side of a six-wheel motor truck for a diesel electric locomotive. The left side of the truck is not shown, since it is provided with brake rigging which is an enantiomorphic counterpart of that described.

The brake rigging comprises a hanger lever 4 disposed at the rear side of the front wheel 1, a hanger lever 5 disposed at the forward side of the middle wheel 2, and a hanger lever 6 disposed at the forward side of the rear wheel 3. The hanger levers are pivotally attached at their upper ends to the truck frame by means of pivot pins 7, and each hanger lever is provided at its lower end with spaced jaws 8 which form a recess 9. A brakehead 10 is pivotally attached to each hanger lever intermediate its ends, and each brakehead carries a brake shoe 11 for engagement with the tread of the associated wheel.

The several brake shoes are operated into and out of engagement with their associated wheels by means of a fluid pressure motor including a cylinder 12 having a piston 13 movable therein. A spring 14 biases the piston 13 in a brake releasing direction. The piston 13 operates a piston rod 15, which is operatively connected to the upper end of a brake cylinder lever 16. The brake cylinder lever 16 is pivotally supported on a crankshaft 17 which extends through a bearing 18 in the truck frame. On the inside of the bearing 18, the crankshaft 17 carries a crank arm 19 which is pivotally connected to one end of a push connector 20. At its other end the push connector 20 is pivotally connected to an intermediate point on an equalizer lever 21 mounted horizontally and extending transversely of the truck.

The inner end of equalizer lever 21 is secured within the recess 9 in the hanger lever 6 by means of a pivot pin 21a which extends through registered openings formed in the equalizer lever and in the jaws 8 of the hanger.

The outer end of equalizer lever 21 is pivotally connected to one end of a pull rod 22, which extends forwardly of the truck and is pivoted at its opposite end to the end of a slidably guided pull link 23. The push connector 20 and the pull rod 22 are both supported on a single bracket 24 carried by a strap 25 which is attached at its opposite ends to the truck frame The pull link 23 is slotted at 23a to receive a pin 26 which extends between the sides of a generally U-shaped bracket 27 (see Fig. 3). A lever 28 is bifurcated at 28a, and its bifurcated end straddles the link 23. The bifurcated end of lever 28 is provided with apertures which receive the pin 26, so that the pin 26 forms a fixed pivot for lever 28.

The link 23 also is supported and guided by a bracket 29 attached to the frame of the truck. These widely spaced supporting brackets on the link 23 provide a considerable mechanical advantage for the reactive guiding forces over any transversely acting displacing forces which may act on the pull link.

The forward end of pull link 23 is pivotally connected to the outer end of an equalizer lever 30. The inner end of equalizer lever 30 is connected by means of a pin 31 to the lower end of brake hanger 4. A push connector 32 is pivotally connected to an intermediate point on the equalizer lever 30, and has its opposite end pivotally connected to an intermediate point on lever 28. The push connector 32 includes a slack adjuster 33 of well-known construction. The outer end of lever 28 is pivoted in bracket 27, as previously described. The inner end of lever 28 is pivotally connected to the lower end of hanger 5 by means of a pivot pin 34. Push connector 32 is slidably guided by bracket 29.

The brakehead 10 for wheel 1 is attached to the brake hanger 4 by means of a brakehead pin 35. The brakehead 10 for wheel 2 is attached to the brake hanger 5 by means of a brakehead pin 36.

A strap 37 is pivotally mounted on the brakehead pin 35. A similar strap 38 is pivotally mounted on the brakehead pin 36 by means of a slot 38a, which provides a lost-motion connection. The two straps 37 and 38 are connected together by a slip friction connection including a slot 38b in the strap 38, and a pin 39 extending through an aperture in the strap 37 and through the slot 38b. A coil spring 40 is retained in compression on the pin 39 and holds the straps 37 and 38 in tight frictional engagement. A guide clamp 41 is attached to the end of strap 38 and slidably receives the strap 37 so as to prevent angular displacement of the two straps 37 and 38.

A lug 38c is attached to the strap 38, and is apertured to receive a spring rod 42 which is pivotally mounted on the pin 36. A brake releasing coil spring 43 surrounds the spring rod 42 between the lug 38c and a spring retaining nut 44 held on the spring rod by means of a lock nut 45.

Operation

When it is desired to apply the brakes, compressed air is admitted to cylinder 12 and moves the piston 13 to the right, carrying with it the piston rod 15 and rotating the brake cylinder lever 16 and the crank 19 clockwise as viewed in Fig. 1. This drives the push connector 20 toward the rear of the truck. Since the friction load on the outer end of the equalizer lever 21 is greater than the friction load on the inner end, this motion of the push connector first rotates the equalizer lever about the outer end as a fulcrum, thereby moving the inner end until the brake shoe 11 engages wheel 3. Thereafter the equalizer lever pivots about its inner end, and the outer end moves rearwardly, carrying the pull rod 22 and pull link 23 along with it. This causes equalizer lever 30 to pivot about the push connector 32 until its inner end moves far enough to cause engagement of brake shoe 11 with wheel 1. Thereafter the equalizer lever 30 pivots about its inner end, carrying the push connector 32 rearwardly and causing the lever 28 to pivot in a counterclockwise direction and to move the brake shoe 11 into engagement with wheel 2. Although the brake shoe for wheel 3 may touch its associated wheel first, the brake shoe for wheel 1 second and the brake shoe for wheel 2 last, it will be understood that no substantial braking forces are applied to any of the wheels until all of the brake shoes are in engagement with their respective wheels. The braking force applied through either end of an equalizer lever can be no greater than the reactive force on the opposite end. The reactive forces and hence the braking forces cannot reach any appreciable value until the brake shoes are all engaging their associated wheels.

When it is desired to release the brakes, the pressure in cylinder 12 is exhausted to atmosphere. The spring 14 then moves piston 13 and piston rod 15, to the left. The brake cylinder lever 16 and crank 19 are thereby rotated counterclockwise, as they appear in Fig. 1a. This moves the push connector 20 forwardly. The spring 14 thereby insures that the intermediate pivot point on equalizer 21 is restored to its released position.

If the additional brake releasing spring 43 were not provided, it might be possible for either or both of the brake shoes associated with the front wheels 1 and 2 to stick at or near their braking positions because of frictional forces between the various elements of the linkage and their respective guides. In case of such a sticking, the main release spring 14 could still return the push connector to its normal position. The inner end of equalizer lever 21 would then travel beyond its normal released position to compensate for the sticking of pull rod 22.

However, when the brakes are released, the spring 43, which is compressed during application of the brakes, becomes effective to bias the straps 37 and 38 toward the left and to bias the spring rod 42 toward the right, thereby biasing the brakehead pins 35 and 36 toward their released positions. The lost motion connection provided by slot 38a permits the relative motion of spring rod 42 and strap 38 necessary to move the two brakehead pins with their associated brake shoes to their released positions. Spring 43 is therefore effective to produce a clockwise movement of lever 28 (as viewed in Fig. 2b) about its fixed pivot and a counterclockwise movement of equalizer lever 30. Both of these movements combine to drive the pull link 23 and the rod 22 to the right a distance determined by the length of slot 38a. The spring 43 is therefore effective to produce a definite brake releasing travel of pull rod 22 and hence of the outer end of equalizer lever 21. Since the spring 14 produces a definite releasing travel of the central pivot on equalizer lever 21, it may be seen that these two springs acting together cooperate to restore all the parts of the brake rigging to their brake releasing positions.

Since the slot 38a determines the brake releasing travel from the brake shoes associated with wheels 1 and 2, it also determines the brake applying travel of these shoes. Some means must therefore be provided to compensate for wear of the shoes and the wheels so that the wheels may be brakingly engaged by the shoes regardless of such wear and so that the brake releasing travel of the shoes will not increase as the wear increases. The means provided herein is the slip friction connection between the straps 37 and 38.

When the brake shoes or wheels wear so that the slot 38a does not permit sufficient relative movement of the hangers 4 and 5 for both shoes to engage their associated wheels, then the braking force supplied from the cylinder 12 through the linkage causes the straps 37 and 38 to slip relative to each other by virtue of their slip friction connection, thereby providing the additional necessary movement of the two hangers to apply their associated brakes. It should be noted that this adjustment of the slip friction connection does not affect the releasing travel of the brake shoes, which is determined by the length of the slot 38a.

It should also be noted that in the construction shown herein, the adjustment of the slack adjuster 33 has no effect upon the tension of the brake releasing spring 43.

Although I have herein shown and described but one form of brake mechanism embodying my invention, it is understood that various changes and modifications may be made therein within the scope of the appended claims without departing from the spirit and scope of my invention.

Having thus described my invention, what I claim is:

1. Brake mechanism for a vehicle having at least two wheels on each side thereof, comprising a brake shoe for each of said wheels, a brake hanger for each shoe, said hangers being located on adjacent sides of said two wheels, a pin extending transversely through each of the hangers, a pair of straps, a strap being pivoted on each pin, said straps extending toward each other; one of said straps being slotted to permit lengthwise movement of the strap on its associated pin, an apertured lug on the slotted strap, a rod pivoted on the pin adjacent the slotted strap and extending through the aperture in said lug, a spring retainer on the end of said rod, a coil spring surrounding said spring rod between said retainer and said lug to bias said hangers in a brake-releasing direction, and a slip friction connection between said straps to compensate for wear of the brake shoes and wheels.

2. Brake mechanism for a vehicle having at least two wheels on each side thereof, comprising a brake shoe for each of said wheels, a brake hanger for each of said brake shoes, said brake hangers being located on adjacent sides of said two wheels, a brake head for supporting each brake shoe, a brake head pin for connecting each brake head to its associated hanger, and means interconnecting said brake head pins and wholly supported thereby between the brake hangers, said means including a slotted connection with one of said pins and resilient means connected with the brake head pin of the slotted connection and the interconnecting means for biasing said hangers toward each other in a brake releasing direction.

EMIL G. MUELLER.

References Cited in the file of this patent

UNITED STATES PATENTS

| Number | Name | Date |
| --- | --- | --- |
| 568,065 | Cliff | Sept. 22, 1896 |
| 651,603 | Goughnour | June 12, 1900 |
| 878,181 | Barber | Feb. 4, 1908 |
| 1,136,620 | Sauvage | Apr. 20, 1915 |
| 1,143,706 | Hedgcock | June 22, 1915 |
| 1,227,945 | Sauvage | May 29, 1917 |
| 1,227,961 | Sauvage | May 29, 1917 |
| 1,298,573 | Sauvage | Mar. 25, 1919 |
| 1,446,855 | Mohun | Feb. 27, 1923 |
| 1,820,856 | Whitridge et al. | Aug. 25, 1931 |
| 1,913,625 | Crossman | June 13, 1933 |
| 1,914,595 | Crossman | June 20, 1933 |
| 2,122,975 | Christianson | July 5, 1938 |
| 2,210,038 | Mueller | Aug. 6, 1940 |
| 2,427,956 | Gantner | Sept. 23, 1947 |
| 2,575,825 | McGowan | Nov. 20, 1951 |